(12) United States Patent
Natsume

(10) Patent No.: US 8,900,093 B2
(45) Date of Patent: Dec. 2, 2014

(54) CONTROL DEVICE OF VEHICLE DRIVE DEVICE

(75) Inventor: Hiroshi Natsume, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 62 days.

(21) Appl. No.: 13/879,314

(22) PCT Filed: Oct. 14, 2010

(86) PCT No.: PCT/JP2010/068058
§ 371 (c)(1),
(2), (4) Date: Apr. 12, 2013

(87) PCT Pub. No.: WO2012/049754
PCT Pub. Date: Apr. 19, 2012

(65) Prior Publication Data
US 2013/0196816 A1  Aug. 1, 2013

(51) Int. Cl.
| | |
|---|---|
| B60K 1/02 | (2006.01) |
| B60W 20/00 | (2006.01) |
| B60W 10/06 | (2006.01) |
| B60K 6/48 | (2007.10) |
| B60K 6/547 | (2007.10) |
| B60W 30/18 | (2012.01) |
| B60W 10/08 | (2006.01) |

(52) U.S. Cl.
CPC ............. *B60W 20/10* (2013.01); *Y02T 10/6286* (2013.01); *B60W 20/00* (2013.01); *B60W 10/06* (2013.01); *B60W 2510/0623* (2013.01); *Y10S 903/902* (2013.01); *Y02T 10/6221* (2013.01); *B60K 6/48* (2013.01); *B60K 6/547* (2013.01); *B60W 30/18072* (2013.01); *B60W 2510/0647* (2013.01); *B60W 10/08* (2013.01)

USPC .............................................. 477/3; 903/902

(58) Field of Classification Search
USPC ............... 477/3, 5, 8, 11, 166, 174, 176, 178, 477/902; 903/930, 946, 951; 180/65.265, 180/65.275, 65.285
See application file for complete search history.

(56) References Cited

U.S. PATENT DOCUMENTS

| | | | | |
|---|---|---|---|---|
| 4,021,677 | A | * | 5/1977 | Rosen et al. ................. 290/40 R |
| 5,428,541 | A | * | 6/1995 | Miyata et al. .................... 701/85 |
| 6,093,974 | A | * | 7/2000 | Tabata et al. ................. 290/40 R |
| 2007/0099749 | A1 | * | 5/2007 | Zillmer et al. ..................... 477/3 |

FOREIGN PATENT DOCUMENTS

| | | |
|---|---|---|
| CN | 1782473 A | 6/2006 |
| JP | 2002-213279 A | 7/2002 |
| JP | 2008-213565 A | 9/2008 |
| JP | 2008-213720 A | 9/2008 |

* cited by examiner

*Primary Examiner* — Justin Holmes
(74) *Attorney, Agent, or Firm* — Kenyon & Kenyon LLP

(57) ABSTRACT

A control device of a vehicle drive device having an electric motor coupled to a power transmission path between an engine and drive wheels, the control device providing fuel cut electric motor drive control of increasing a rotation speed of the engine with a drive force of the electric motor and interrupting fuel supply to the engine at the time of acceleration operation of a vehicle, and the fuel cut electric motor drive control being terminated if a rotational angular acceleration of the engine becomes equal to or less than a predetermined engine rotational angular acceleration determination value after starting provision of the fuel cut electric motor drive control.

8 Claims, 6 Drawing Sheets

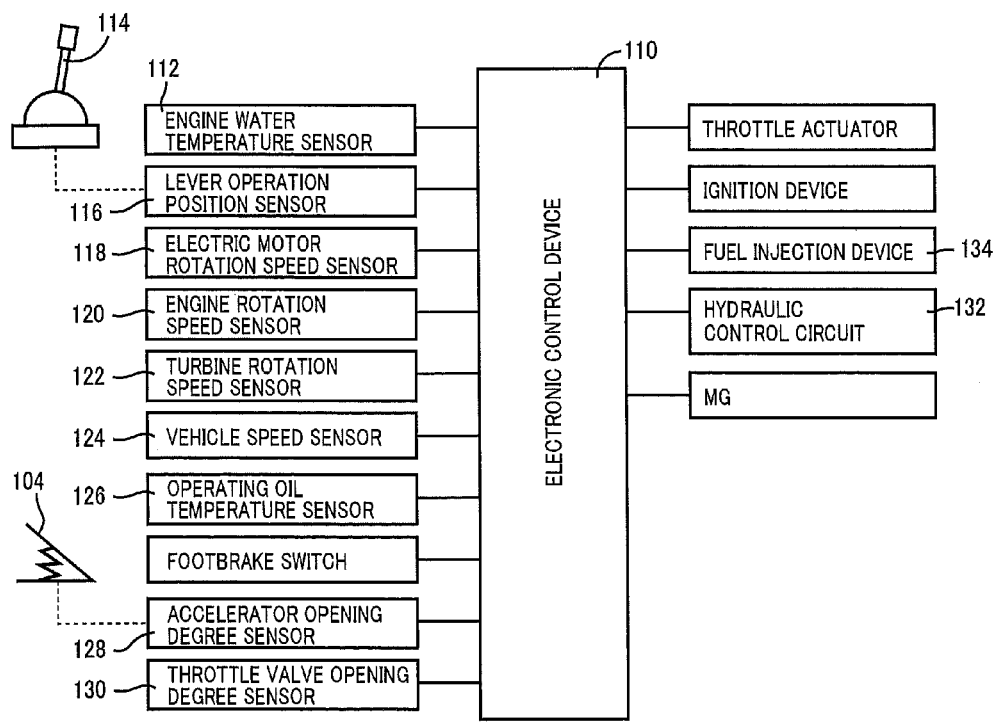

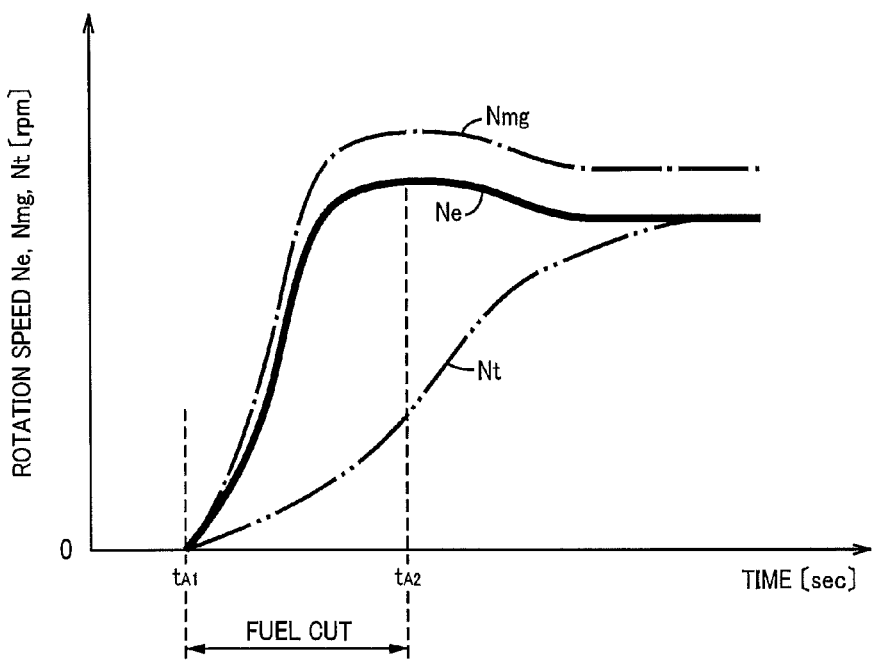
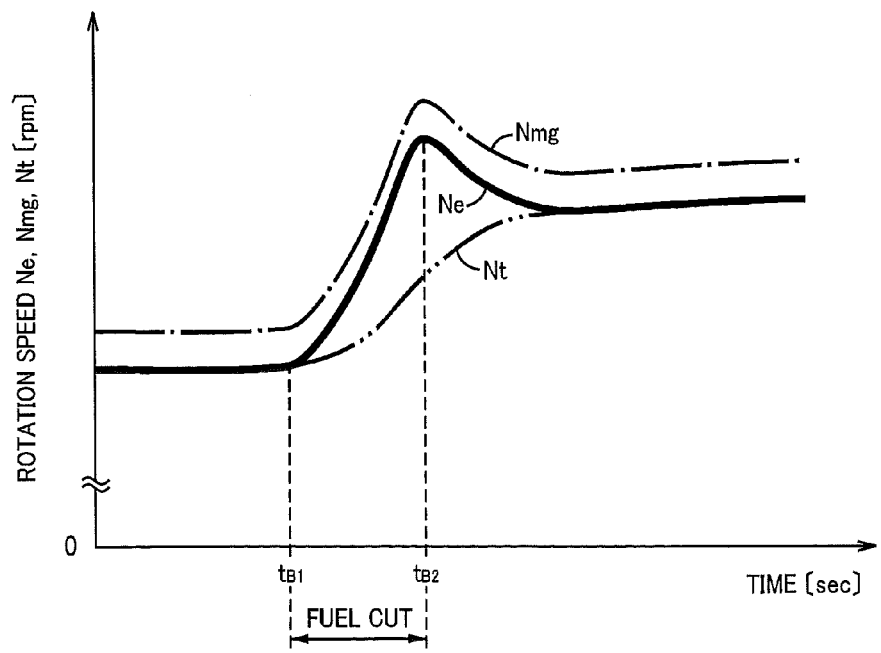

CONTROL DEVICE OF VEHICLE DRIVE DEVICE

This is a 371 national phase application of PCT/JP2010/068058 filed 14 Oct. 2010, the contents of which are incorporated herein by reference.

TECHNICAL FIELD

The present invention relates to control of suppressing fuel efficiency deterioration in a vehicle drive device including an engine and an electric motor.

BACKGROUND ART

A control device of a vehicle drive device executing a fuel cut interrupting fuel supply to an engine is well known in the vehicle drive device including an electric motor coupled in a power transmitting path between the engine and drive wheels. For example, this corresponds to an engine start control device described in Patent Document 1. If the engine is started by the electric motor, the engine start control device of Patent Document 1 stops a fuel cut for the engine and starts the engine at the same time when an accelerator pedal is depressed after a brake is released.

PRIOR ART DOCUMENT

Patent Document

Patent Document 1: Japanese Laid-Open Patent Publication No. 2002-213279

SUMMARY OF THE INVENTION

Problem to be Solved by the Invention

In a vehicle drive device including an engine and an electric motor such as the vehicle drive device of Patent Document 1, engine rotation speed is increased to accelerate a vehicle at the time of vehicle start or acceleration. In this case, an inertia torque (inertial torque) corresponding to inertia (inertia moment) and engine rotational acceleration of the engine is necessary for increasing the engine rotation speed. Although the engine rotation speed can be increased by output torque of one or both of the engine and the electric motor, it is considered advantageous to consume electric power accumulated through regenerative operation of the electric motor etc., for increasing the engine rotation speed as compared to consuming the fuel of the engine for increasing the engine rotation speed, in terms of improvement in fuel efficiency. In other words, it is considered that vehicle fuel efficiency may deteriorate if the engine rotation speed is increased by the output torque of the engine at the time of vehicle start or acceleration. Such a problem is not known.

The present invention was conceived in view of the situations and it is therefore an object of the present invention to provide a control device of a vehicle drive device capable of suppressing fuel efficiency deterioration in the vehicle drive device including an engine and an electric motor.

Means for Solving the Problems

To achieve the object, the present invention provides (a) a control device of a vehicle drive device having an electric motor coupled to a power transmission path between an engine and drive wheels, (b) the control device providing fuel cut electric motor drive control of increasing a rotation speed of the engine with a drive force of the electric motor and interrupting fuel supply to the engine at the time of acceleration operation of a vehicle.

The Effects of the Invention

When the rotation speed of the engine (engine rotation speed) is increased at the time of vehicle acceleration, fuel efficiency deterioration can often be suppressed by increasing the engine rotation speed by electric motor drive rather than engine drive. Therefore, as described in the above present invention, if the engine rotation speed is increased, the interruption of the fuel supply to the engine by the fuel cut electric motor drive control can suppress the fuel efficiency deterioration. For example, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrary, deterioration in fuel efficiency refers to shortening of the running distance per unit fuel consumption or increase in fuel consumption rate of the vehicle as a whole. Since the start of the vehicle is acceleration from a vehicle speed of zero, the acceleration operation of the vehicle includes an acceleration operation at the time of vehicle start.

Preferably, the fuel cut electric motor drive control is provided on the condition that a maximum drive torque capable of being output during the fuel cut electric motor drive control estimated based on a maximum output torque of the electric motor is greater than a request drive torque requested by a driver. Consequently, the interruption of the fuel supply to the engine can be prevented from making the drive force of the vehicle insufficient in the fuel cut electric motor drive control so as not to give an uncomfortable feeling to a driver.

Preferably, the fuel cut electric motor drive control is terminated if a rotational angular acceleration of the engine becomes equal to or less than a predetermined engine rotational angular acceleration determination value after starting provision of the fuel cut electric motor drive control. Consequently, since the rotational angular acceleration of the engine can easily be calculated by sequentially detecting the engine rotation speed, the ending time of the fuel cut electric motor drive control can easily be determined.

Preferably, the vehicle drive device further comprises a transmission interposed between the drive wheels and both the engine and the electric motor and a fluid transmission device interposed between the transmission and both the engine and the electric motor. Consequently, when a change in the engine rotation speed is more temporary or rapid, a greater fuel efficiency improvement effect is acquired by increasing the engine rotation speed with the electric motor and since the engine rotation speed tends to temporarily increase due to a slip of the fluid transmission device, for example, at the time of vehicle acceleration, the provision of the fuel cut electric motor drive control can more properly produce the effect of suppressing the fuel efficiency deterioration.

Preferably, (a) the fluid transmission device includes a lockup clutch capable of directly coupling an input-side rotating element and an output-side rotating element of the fluid transmission device, and wherein (b) the fuel cut electric motor drive control is provided when the lockup clutch is in a released state or a slip state. Consequently, for example, since the engine rotation speed tends to temporarily increase when the lockup clutch is in the released state or the slip state at the time of vehicle acceleration etc., as compared to the engaged state, the provision of the fuel cut electric motor drive control can more properly produce the effect of suppressing the fuel efficiency deterioration.

Preferably, the vehicle drive device further comprises a transmission interposed between the drive wheels and both the engine and the electric motor and a friction engagement device interposed between the transmission and both the engine and the electric motor. Consequently, for example, the provision of the fuel cut electric motor drive control in a hybrid vehicle having the engine, the electric motor, the friction engagement device, and the transmission coupled in series can suppress the fuel efficiency deterioration.

Preferably, the engine, the fluid transmission device, and the electric motor are disposed such that the axial centers thereof are parallel to an axial direction of a driving axle coupled to the drive wheels and rotationally driving the drive wheels.

Preferably, the electric motor is operatively coupled to or directly coupled to the engine.

BRIEF DESCRIPTION OF THE DRAWINGS

FIG. 3 is an operation table for explaining the operation state of the engagement elements when a plurality of shift stages (gear stages) is established in the automatic transmission included in the vehicle drive device of FIG. 1.

FIG. 4 is a diagram for explaining an input signal and an output signal to and from an electronic control device provided in the vehicle drive device of FIG. 1.

FIG. 6 is a time chart for explaining a provision period of a fuel cut electric motor drive control provided in the vehicle drive device of FIG. 1, and is the time chart of an engine rotation speed Ne, a turbine rotation speed Nt, and an electric motor rotation speed Nmg at the time of vehicle start.

FIG. 7 is a time chart for explaining a provision period of a fuel cut electric motor drive control provided in the vehicle drive device of FIG. 1, and is the time chart of the engine rotation speed Ne, the turbine rotation speed Nt, and the electric motor rotation speed Nmg at the time of acceleration during vehicle running.

MODES FOR CARRYING OUT THE INVENTION

An embodiment of the present invention will now be described in detail with reference to the drawings.

Embodiment

Figure 1:
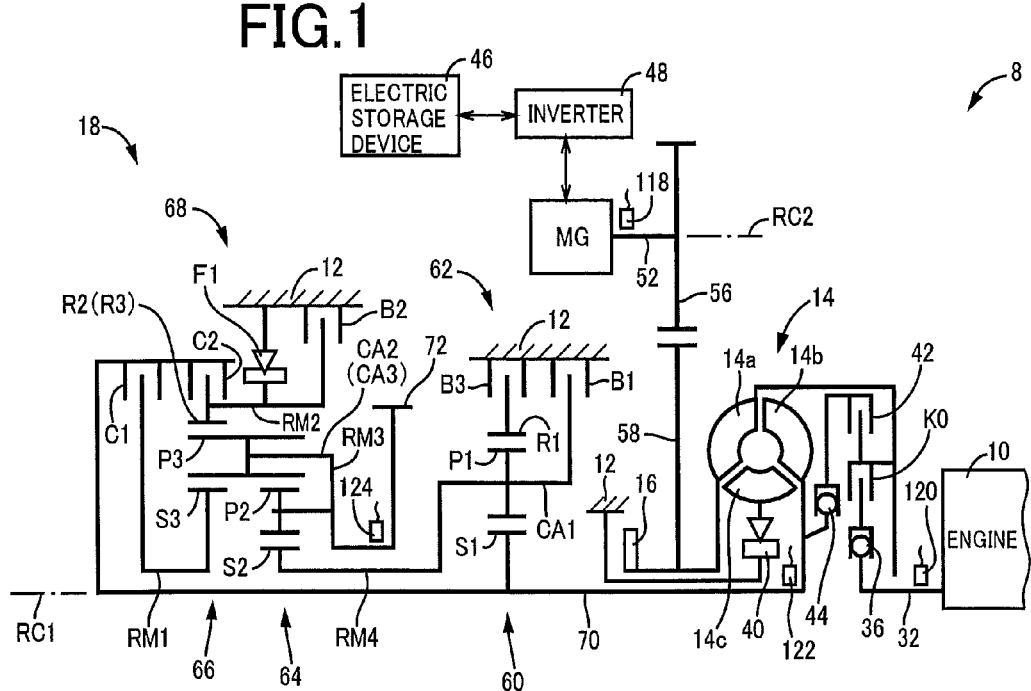
FIG. 1 is a schematic for explaining a configuration of a vehicle drive device to which the present invention is preferably applied.
Figure 2:
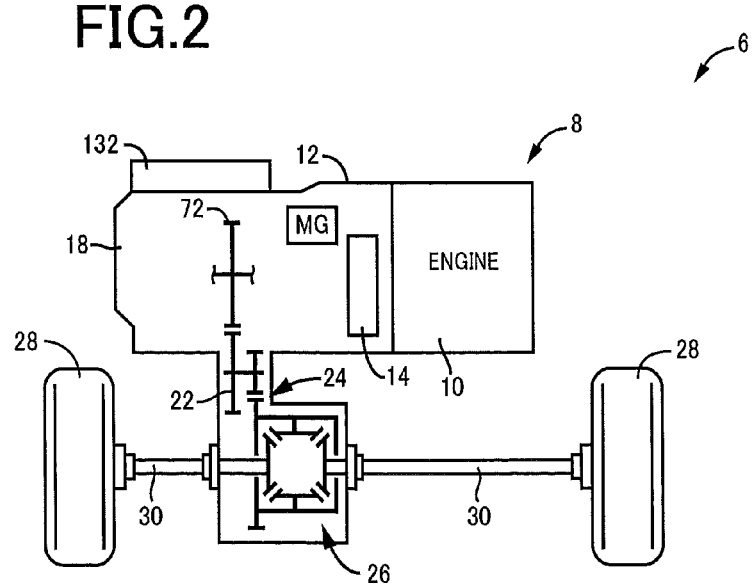
FIG. 2 is a diagram of a power transmission path from the vehicle drive device of FIG. 1 to drive wheels.

FIG. 1 is a schematic for explaining a configuration of a vehicle drive device 8 (hereinafter referred to as the "drive device 8") to which the present invention is preferably applied. FIG. 2 is a diagram of a power transmission path from the drive device 8 to drive wheels 28. An automatic transmission 18, a torque converter 14, etc., are configured substantially symmetrically relative to a center line (a first axial center RC1) and lower halves from the center line are not depicted in FIG. 1. The first axial center RC1 of FIG. 1 is a rotational axial center of the engine 10 and the torque converter 14 and a second axial center RC2 is a rotational axial center of an electric motor MG As depicted in FIG. 1, the drive device 8 has a transaxle case (T/A case) 12 (hereinafter referred to as the "case 12") as a non-rotating member attached to a vehicle body by bolts etc., includes an engine intermittent clutch K0, the torque converter 14, a hydraulic pump 16, and the automatic transmission 18 in the case 12 on the first axial center RC1 in order, i.e., in series, from the side of the engine 10, and includes the electric motor MG rotationally driven around the second axial center RC2 parallel to the first axial center RC1. The drive device 8 includes a counter driven gear 22 engaged with an output gear 72 that is an output rotating member of the automatic transmission 18, a final gear pair 24, and a differential gear device (differential gear) 26 coupled via the final gear pair 24 to the counter driven gear 22 in the case 12 as shown in FIG. 2. The drive device 8 configured as described above is transversely mounted on the front side of a front-wheel drive, i.e., FF (front-engine front-drive) type vehicle 6 and is preferably used for driving the drive wheels 28. In the drive device 8, if the engine intermittent clutch K0 is engaged, the power of engine 10 is transmitted from a crankshaft 32 of the engine 10, i.e., an engine output shaft 32 sequentially through the engine intermittent clutch K0, the torque converter 14, the automatic transmission 18, the counter driven gear 22, the final gear pair 24, the differential gear device 26, a pair of driving axles 30, etc., to a pair of the drive wheels 28.

The torque converter 14 is a fluid transmission device interposed between the automatic transmission 18 and both the engine 10 and the electric motor MG and disposed to rotate around the first axial center RC1 and includes a pump impeller 14a, a turbine impeller 14b, and a stator impeller 14c. The torque converter 14 transmits a drive force input to the pump impeller 14a via fluid to the automatic transmission 18. The pump impeller 14a of the torque converter 14 is coupled via the engine intermittent clutch K0 to the crankshaft 32 of the engine 10. Therefore, the pump impeller 14a is an input-side rotating element selectively receiving the input of the drive force from the engine 10 depending on engagement or release of the engine intermittent clutch K0 and rotatable around the first axial center RC1. A turbine impeller 14b is an output-side rotating element of the torque converter 14 and is relatively non-rotatably coupled by the spline fitting, etc., to a transmission input shaft 70 that is an input shaft of the automatic transmission 18. The stator impeller 14c is coupled via a unidirectional clutch 40 to the case 12. Therefore, the stator impeller 14c is coupled via the unidirectional clutch 40 to the non-rotating member. An input damper 36 is interposed between the engine intermittent clutch K0 and the crankshaft 32 of the engine 10 and, when the engine intermittent clutch K0 is engaged, the input damper 36 transmits torque while absorbing pulsation of the torque between the pump impeller 14a and the engine 10.

The torque converter 14 includes a lockup clutch 42 and a lockup clutch damper 44. The lockup clutch 42 is a direct clutch interposed between the pump impeller 14a and the turbine impeller 14b to selectively directly couple the pump impeller 14a and the turbine impeller 14b and is put into an engaged state (lockup-on state), a slip state (lockup slip state), or a released state (lockup-off state) by hydraulic control etc. When the lockup clutch 42 is put into the engaged state, or a completely engaged state to be exact, the pump impeller 14a and the turbine impeller 14b are integrally rotated around the first axial center RC1. The lockup clutch damper 44 has the same function as the input damper 36 described above and is interposed between the lockup clutch 42 and the turbine impeller 14b.

The engine intermittent clutch K0 acts as a power interruption device interrupting the power transmission between the engine 10 and the pump impeller 14a of the torque converter 14. For example, the engine intermittent clutch K0 is a wet multi-plate type hydraulic friction engagement device in which a plurality of friction plates overlapped with each other is pressed by a hydraulic actuator, and is subjected to engagement/release control by a hydraulic control circuit 132 included in the drive device 8 by using an oil pressure generated by the hydraulic pump 16 as an original pressure. In the engagement/release control, a power-transmittable torque capacity of the engine intermittent clutch K0, i.e., an engagement force of the engine intermittent clutch K0 is varied, for example, continuously, through pressure regulation of a linear solenoid valve etc., in the hydraulic control circuit 132. The engine intermittent clutch K0 includes a pair of clutch rotating members (a clutch hub and a clutch drum) relatively rotatable around the first axial center RC1 in the released state thereof and one of the clutch rotating members (the clutch hub) is relatively non-rotatably coupled to the crankshaft 32 of the engine 10 while the other clutch rotating member (the clutch drum) is relatively non-rotatably coupled to the pump impeller 14a of the torque converter 14. Because of such a configuration, the engine intermittent clutch K0 rotates the pump impeller 14a integrally with the crankshaft 32 of the engine 10 in the engaged state. Therefore, in the engaged state of the engine intermittent clutch K0, the drive force from the engine 10 is input to the pump impeller 14a. On the other hand, in the released state of the engine intermittent clutch K0, the power transmission between the pump impeller 14a and the engine 10 is interrupted.

The electric motor MG is disposed with a rotation axial center that is the second axial center RC2 parallel to the first axial center RC1 and is a so-called motor generator having a motor function of outputting a drive force and an electric generation function of charging an electric storage device 46. An electric motor output shaft 52 acting as an output shaft of the electric motor MG has an electric motor output gear 56 coupled relatively non-rotatably and the electric motor output gear 56 is mutually engaged with an electric motor coupling gear 58 coupled relatively non-rotatably to the pump impeller 14a of the torque converter 14. Therefore, the electric motor MG is coupled via a gear pair made up of the electric motor output gear 56 and the electric motor coupling gear 58 to the pump impeller 14a as well as the engine 10 and is also coupled via the torque converter 14 to the transmission input shaft 70.

The pitch circle diameter of the electric motor output gear 56 is smaller than the pitch circle diameter of the electric motor coupling gear 58. Therefore, since the number of teeth of the electric motor output gear 56 is smaller than the number of teeth of the electric motor coupling gear 58, the rotation of the electric motor MG is reduced and transmitted to the pump impeller 14a. In other words, an output torque Tmg of the electric motor MG (hereinafter referred to as the "electric motor torque Tmg") is amplified and transmitted from the electric motor MG to the pump impeller 14a.

The automatic transmission 18 is a transmission interposed between the drive wheels 28 (see FIG. 2) and both the engine 10 and the electric motor MG and is a transmission to which the drive force from the engine 10 and the electric motor MG is input through the torque converter 14. The automatic transmission 18 is a transmission including a plurality of hydraulic friction engagement devices (clutches C and brakes B), specifically, five hydraulic friction engagement devices and selectively establishing a plurality of shift stages (gear stages) by switching any of the plurality of the hydraulic friction engagement devices to be gripped. In short, the automatic transmission 18 is a stepped transmission executing a so-called clutch-to-clutch shift frequently used in common vehicles. As depicted in FIG. 1, the automatic transmission 18 has a first transmission portion 62 made up mainly of a first planetary gear device 60 of the single pinion type and a second transmission portion 68 made up mainly of a second planetary gear device 64 of the double pinion type and a third planetary gear device 66 of the single pinion type as the Ravigneaux type on the same axis line (on the first axial center RC1) and changes the speed of the rotation of the transmission input shaft 70 to output the rotation from the output gear 72. The transmission input shaft 70 corresponds to an input member of the automatic transmission 18 and is a turbine shaft rotationally driven by the turbine impeller 14b of the torque converter 14 in this embodiment. The output gear 72 corresponds to an output member of the automatic transmission 18 and mutually engages with the counter driven gear 22 (see FIG. 2) to make up one gear pair together with the counter driven gear 22. As depicted in FIG. 2, the rotation of the output gear 72 is transmitted sequentially through the counter driven gear 22, the final gear pair 24, the differential gear device 26, and a pair of the driving axles 30 to a pair of the drive wheels (front wheels) 28 and, therefore, when an output rotation speed Nout (rpm) of the automatic transmission 18, i.e., the rotation speed of the output gear 72 is higher, a vehicle speed V (km/h) is higher, and the output rotation speed Nout corresponds one-to-one to the vehicle speed V.

The first planetary gear device 60 making up the first transmission portion 62 includes a first sun gear S1, a first pinion gear P1, a first carrier CA1 supporting the first pinion gear P1 in a rotatable and revolvable manner, and a first ring gear R1 engaging via the first pinion gear P1 with the first sun gear S1, and the first sun gear S1, the first carrier CA1, and the first ring gear R1 respectively make up three rotating elements. In the first planetary gear device 60, when the first sun gear S1 is coupled to the transmission input shaft 70 and rotationally driven and the first ring gear R1 is non-rotatably fixed via a third brake B3 to the case 12, the first carrier CA1 acting as an intermediate output member is rotated at a reduced speed relative to the transmission input shaft 70.

The second planetary gear device 64 making up the second transmission portion 68 includes a second sun gear S2, a second pinion gear P2 and a third pinion gear P3 engaged with each other to make up a pair, a second carrier CA2 supporting the pinion gears P2 and P3 in a rotatable and revolvable manner, and a second ring gear R2 engaging via the pinion gears P2 and P3 with the second sun gear S2. The third planetary gear device 66 making up the second transmission portion 68 includes a third sun gear S3, a third pinion gear P3, a third carrier CA3 supporting the third pinion gear P3 in a rotatable and revolvable manner, and a third ring gear R3 engaging via the third pinion gear P3 with the third sun gear S3. In the second planetary gear device 64 and the third planetary gear device 66, portions are coupled to each other to make up four rotating elements RM1 to RM4. Specifically, the third sun gear S3 of the third planetary gear device 66 makes up a first rotating element RM1; the second ring gear R2 of the second planetary gear device 64 and the third ring gear R3 of the third planetary gear device 66 are coupled to each other to make up a second rotating element RM2; the second carrier CA2 of the second planetary gear device 64 and the third carrier CA3 of the third planetary gear device 66 are coupled to each other to make up a third rotating element RM3; and the second sun gear S2 of the second planetary gear device 64 makes up a fourth rotating element RM4. The second planetary gear device 64 and the third planetary gear device 66 are formed as a Ravigneaux type planetary gear train with the second and third carriers CA2 and CA3 made up of a common member, the second and third ring gears R2 and R3 made up of a common member, and the third pinion gear P3 of the third planetary gear device 66 also acting as one of the pinion gears of the second planetary gear device 64.

The first rotating element RM1 (the third sun gear S3) is selectively coupled via a first clutch C1 to the transmission input shaft 70. The second rotating element RM2 (the ring gears R2, R3) is selectively coupled via a second clutch C2 to the transmission input shaft 70 and is selectively coupled by a second brake B2 to the case 12 to stop rotation. The fourth rotating element RM4 (the second sun gear S2) is integrally coupled to the first carrier CA1 of the first planetary gear device 60 and is selectively coupled by a first brake B1 to the case 12 to stop rotation. The third rotating element RM3 (the carriers CA2, CA3) is integrally coupled to the output gear 72 to output rotation. A unidirectional clutch F1 is an engagement element allowing positive rotation of the second rotating element RM2 (the same rotation direction as the transmission input shaft 70) and preventing inverse rotation and is disposed between the second rotating element RM2 and the case 12 in parallel with the second brake B2.

The clutches C1, C2 and the brakes B1, B2, B3 (hereinafter simply referred to as "clutches C", "brakes B" if not particularly distinguished) are hydraulic friction engagement devices (hydraulic friction engagement elements) subjected to engagement/release control by hydraulic actuators, such as wet multi-plate type clutches and brakes, and are subjected to engagement/release control by the hydraulic control circuit 132 included in the drive device 8 by using an oil pressure generated by the hydraulic pump 16 as an original pressure such that respective torque capacities, i.e., engagement forces of the clutches C and the brakes B are varied, for example, continuously, through pressure regulation of a linear solenoid valve etc., in the hydraulic control circuit 132. The engagement/release control of each of the clutches C and the brakes B establishes each gear stage (each shift stage) of six forward speeds and one reverse speed as depicted in FIG. 3 depending on accelerator operation of a driver, a vehicle speed V, etc. In FIG. 3, "1st" to "6th" mean the first to sixth speed forward gear stages; "R" means the reverse gear stage; and gear ratios γ (=input rotation speed Nin/output rotation speed Nout) of the automatic transmission 18 corresponding to the gear stages are appropriately determined by gear ratios (=the number of sun gear teeth/the number of ring gear teeth) ρ1, ρ2, and ρ3 of the first planetary gear device 60, the second planetary gear device 64, and the third planetary gear device 66. An operation table of FIG. 3 summarizes the relationship between the gear stages and the operation state of the clutches C1, C2, and the brakes B1 to B3 with "circles" indicative of engagement, a "double circle" indicative of engagement only during engine brake, and blanks indicative of release. The input rotation speed Nin is a rotation speed of the transmission input shaft 70 and the output rotation speed Nout is a rotation speed of the output gear 72.

FIG. 3 is an operation table for explaining the operation state of the engagement elements when a plurality of shift stages (gear stages) is established in the automatic transmission 18. The automatic transmission 18 has six forward shift stages (forward gear stages) from the first speed gear stage "1st" to the sixth speed gear stage "6th" and a reverse shift stage of the reverse shift stage "R" established depending on a combination of the coupling states of any of the rotating elements (the sun gears S1 to S3, the carriers CA1 to CA3, the ring gears R1 to R3) of the first transmission portion 62 and the second transmission portion 68. As depicted in FIG. 3, for example, with regard to the forward gear stages, (1) the first speed gear stage is established by the engagement of the clutch C1 and the brake B2; (2) the second speed gear stage having a gear ratio γ smaller than the first speed gear stage is established by the engagement of the first clutch C1 and the first brake B1; (3) the third speed gear stage having a gear ratio γ smaller than the second speed gear stage is established by the engagement of the first clutch C1 and the third brake B3; (4) the fourth speed gear stage having a gear ratio γ smaller than the third speed gear stage is established by the engagement of the first clutch C1 and the second clutch C2; (5) the fifth speed gear stage having a gear ratio γ smaller than the fourth speed gear stage is established by the engagement of the second clutch C2 and the third brake B3; and (6) the sixth speed gear stage having a gear ratio γ smaller than the fifth speed gear stage is established by the engagement of the second clutch C2 and the first brake B1. The automatic transmission 18 is basically configured such that the reverse gear stage is established by the engagement of the second brake B2 and the third brake B3 and that a neutral state "N" is achieved by releasing all of the clutches C1, C2, and the brakes B1 to B3. For example, when a shift position $P_{SH}$ of the drive device 8 is an N-position or a P-position, the automatic transmission 18 is in the neutral state and, therefore, all of the clutches C1, C2, and the brakes B1 to B3 are released. In the automatic transmission 18 of this embodiment, two hydraulic friction engagement devices are engaged to achieve a predetermined gear stage and when one of the two hydraulic friction engagement devices is released, the predetermined gear stage is not established and the power transmission path in the automatic transmission 18 is released to be in the neutral state.

Since the unidirectional clutch F1 is disposed in parallel with the brake B2 establishing the first speed gear stage "1st", the brake B2 may not necessarily be engaged at startup (at the time of acceleration). As depicted in FIG. 3, one or the other of the first clutch C1 and the second clutch C2 is always engaged in any of the forward gear stages. In other words, the engagement of the first clutch C1 or the second clutch C2 is a requirement of achievement of the forward gear stages and, therefore, in this embodiment, the first clutch C1 or the second clutch C2 corresponds to a forward clutch (forward clutch).

In FIG. 1, the hydraulic pump 16 is a mechanical oil pump, generates an original pressure for the hydraulic control of the clutches and the brakes, and supplies lubricant oil (operating oil) to lubrication locations such as the ball bearings in the drive device 8. The hydraulic pump 16 is coupled to the pump impeller 14a of the torque converter 14 and is therefore rotationally driven by one or both of the engine 10 and the electric motor MG, for example.

In the drive device 8 configured as above, for example, if engine running is performed by using the engine 10 as the drive force source for running, the engine intermittent clutch K0 is engaged, thereby transmitting the drive force from the engine 10 to the pump impeller 14a. Since the electric motor MG is coupled to the pump impeller 14a via the electric motor output gear 56 and the electric motor coupling gear 58, the electric motor MG is caused to output an assist torque as needed in the engine running. On the other hand, if EV running (motor running) is performed by using the electric motor MG as the drive force source for running with the engine 10 stopped, the engine intermittent clutch K0 is released to interrupt the power transmission path between the engine 10 and the torque converter 14 and the electric motor MG is caused to output the drive force for running.

During vehicle stop such as when the running vehicle 6 temporarily stops, for example, the engine intermittent clutch K0 is released and the engine 10 is stopped while the electric motor MG is caused to rotationally drive the hydraulic pump 16 and to output a creep torque. Alternatively, the engine intermittent clutch K0 is engaged and the engine 10 is driven to cause the engine 10 or the engine 10 and the electric motor MG to rotationally drive the hydraulic pump 16 and to output a creep torque. When the creep torque is output, the drive force from the engine 10 or the electric motor MG is transmitted via the torque converter 14 to the drive wheels 28 and, therefore, the output of the creep torque is easily controlled such that the uncomfortable feeling of passengers is suppressed.

During the braking of the vehicle 6, for example, the electric motor MG is caused to perform regenerative operation to generate electricity with the electric motor MG from a vehicle braking force and the generated electricity is stored via an inverter 48 (see FIG. 1) into the electric storage device 46 (see FIG. 1).

When the engine 10 is started, for example, the engine intermittent clutch K0 is engaged and the engine 10 is rotated by the electric motor torque Tmg for engine start. The same applies to the case of starting the engine 10 during EV running and, in this case, the electric motor MG is caused to output the electric motor output acquired by adding the output for engine start to the output for vehicle running.

FIG. 4 exemplarily illustrates signals input to an electronic control device 110 having a function as a control device for controlling the drive device 8 of this embodiment and signals output from the electronic control device 110. The electronic control device 110 includes a so-called microcomputer consisting of a CPU, a ROM, a RAM, an I/O interface, etc., executes signal processes in accordance with programs stored in advance in the ROM, while utilizing a temporary storage function of the RAM, to provide vehicle control such as the hybrid drive control related to the engine 10 and the electric motor MG, and also has a function as a vehicle engine start control device starting the engine 10.

The electronic control device 110 is supplied, from sensors, switches, etc., as depicted in FIG. 4, with a signal from an engine water temperature sensor 112 indicative of an engine water temperature $TEMP_w$ that is a temperature of engine cooling water cooling the engine 10; a signal from a lever operation position sensor 116 indicative of an operation position of a shift lever 114 operated by a driver for switching the shift position $P_{SH}$ of the drive device 8; a signal from an electric motor rotation speed sensor 118 indicative of a rotation speed Nmg of the electric motor MG (hereinafter referred to as an "electric motor rotation speed Nmg"); a signal from an engine rotation speed sensor 120 indicative of an engine rotation speed Ne that is a rotation speed of the engine 10; a signal from a turbine rotation speed sensor 122 indicative of a turbine rotation speed Nt that is a rotation speed of the turbine impeller 14b of the torque converter 14; a signal from a vehicle speed sensor 124 indicative of the rotation speed Nout of the output gear 72 corresponding to the vehicle speed V; a signal from an operating oil temperature sensor 126 indicative of an operating oil temperature $TEMP_{AT}$ of the automatic transmission 18; a signal indicative of a footbrake operation; a signal from an accelerator opening degree sensor 128 indicative of an accelerator opening degree Acc that is an operation amount of an accelerator pedal 104 corresponding to an output request amount from a driver; a signal from a throttle valve opening degree sensor 130 indicative of an opening degree $\theta_{TH}$ (hereinafter referred to as a "throttle valve opening degree $\theta_{TH}$") of an electric throttle valve actuated and opened/closed by an electric throttle actuator; a signal indicative of a charge remaining amount (state of charge) SOC of the electric storage device 46 (see FIG. 1), etc.

The electronic control device 110 outputs control signals to an engine output control device controlling engine output, for example, a drive signal to a throttle actuator operating the throttle valve opening degree $\theta_{TH}$ of the electric throttle valve included in an intake pipe of the engine 10; a fuel supply amount signal controlling an amount of fuel supply to the intake pipe by a fuel injection device 134 of the engine 10; an ignition signal specifying the timing of ignition of the engine 10 by an ignition device of the engine 10; a command signal commanding the operation of the electric motor MG; and a valve command signal actuating an electromagnetic valve (solenoid valve) included in the hydraulic control circuit 132 for controlling the hydraulic actuators of the clutches C and the brakes B of the automatic transmission 18. For example, during engine running, the electronic control device 110 drives the throttle actuator based on the accelerator opening degree Acc to provide throttle control such that the throttle valve opening degree $\theta_{TH}$ is increased as the accelerator opening degree Acc increases. In this throttle control, the accelerator opening degree Acc corresponds one-to-one to the throttle valve opening degree $\theta_{TH}$.

For example, when the vehicle 6 is started or accelerated during engine running in the lockup-off state in which the lockup clutch 42 is released or in the lockup slip state (flex lockup state) in which the lockup clutch 42 is caused to slip, a slip of the torque converter 14 is temporarily increased and the engine rotation speed Ne rapidly increases. Such a rapid increase in the engine rotation speed Ne temporarily increases inertia torque based on inertia moment of the engine 10 and, if it is attempt to raise the engine rotation speed Ne with engine output against this temporarily increased inertia torque of the engine 10, fuel efficiency may deteriorate. Therefore, in this embodiment, at the time of start or acceleration of the vehicle 6 when the inertia torque of the engine 10 is temporarily increased, a fuel cut is performed to interrupt fuel supply to the engine 10 and the engine 10 is cranked by the output from the electric motor MG to supply a drive force to the drive wheels 28. A main portion of the control function will be described with reference to FIG. 5.

Figure 5:
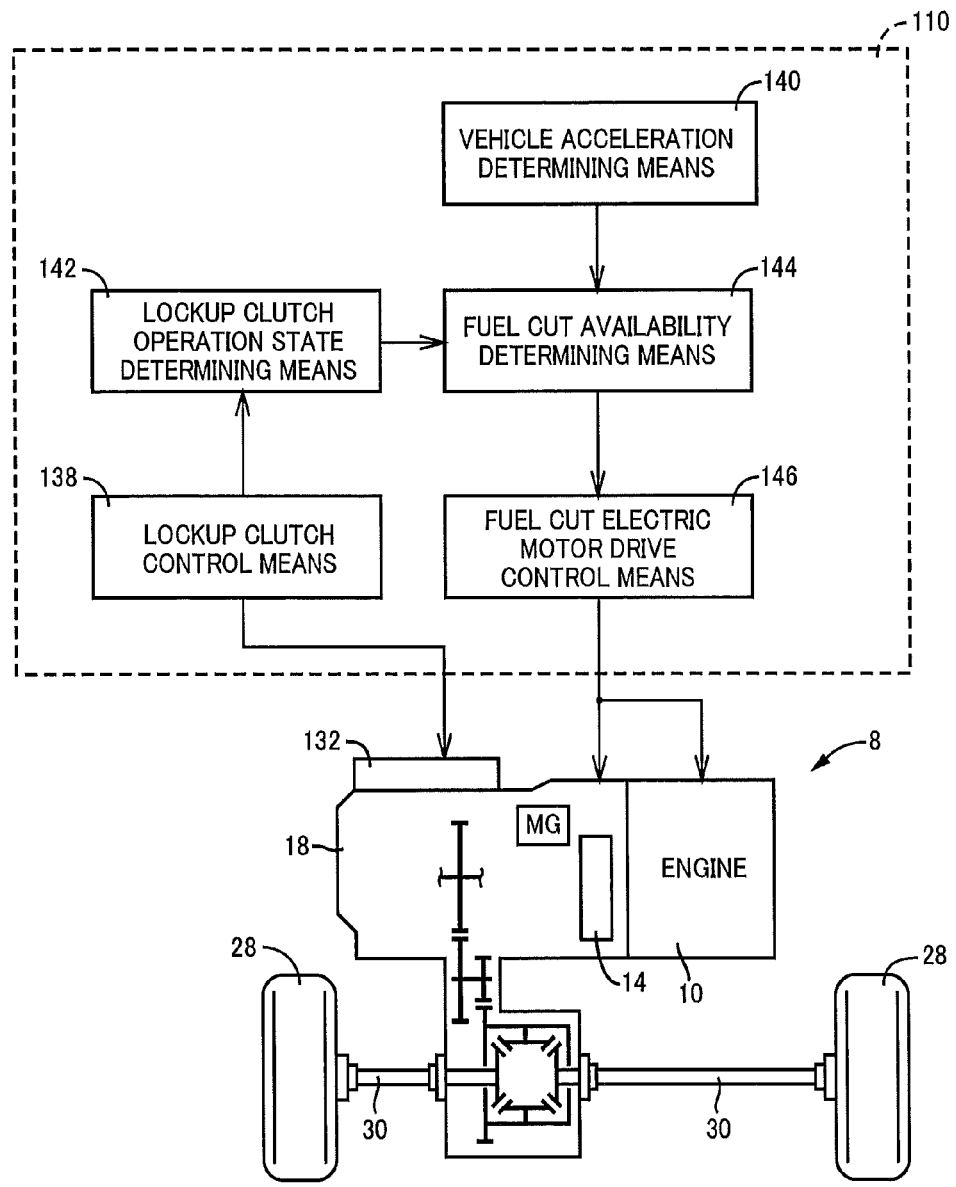
FIG. 5 is a functional block diagram for explaining a main portion of control function included in the electronic control device of FIG. 4.

FIG. 5 is a functional block diagram for explaining a main portion of control function included in the electronic control device 110. As depicted in FIG. 5, the electronic control device 110 includes a lockup clutch control means 138 as a lockup clutch control portion, a vehicle acceleration determining means 140 as a vehicle acceleration determining portion, a lockup clutch operation state determining means 142 as a lockup clutch operation state determining portion, a fuel cut availability determining means 144 as a fuel cut availability determining portion, and a fuel cut electric motor drive control means 146 as a fuel cut electric motor drive control portion.

The lockup clutch control means 138 uses, for example, the vehicle speed V and the accelerator opening degree Acc as variables to store predetermined relationship (map, lockup range diagram) sectionalized into three ranges of a lockup release range (lockup-off range) in which the lockup clutch 42 is turned to the released state, i.e., lockup-off, a slip control operation range (lockup slip control operation range) in which the lockup clutch 42 is turned to the slip state, i.e., lockup slip state, and a lockup control operation range (lockup-on range) in which the lockup clutch 42 is turned to the engaged state (completely engaged state to be exact), i.e., lockup-on. The lockup clutch control means 138 controls switching of the operation state of the lockup clutch 42 based on a vehicle state indicated by the actual vehicle speed V and the accelerator opening degree Acc from the lockup range diagram. For example, the lockup clutch control means 138 determines one of the lockup released range, the lockup slip control operation range, and the lockup control operation range as a range of the lockup clutch 42 based on the actual vehicle state from the lockup range diagram and outputs a lockup control command signal to the hydraulic control circuit 132 for switching the lockup clutch 42 to a lockup release or to a lockup slip control operation or a lockup control operation, thereby causing the hydraulic control circuit 132 to switch the operation state of the lockup clutch 42 in accordance with the lockup control command signal. If the lockup slip control operation range is determined as the range, the lockup clutch control means 138 sequentially calculates an actual slip amount $N_s$(=Ne−Nt) of the lockup clutch 42 and provides hydraulic control of the engagement force of the lockup clutch 42 through the hydraulic control circuit 132 such that the actual slip amount $N_s$ turns to a predetermined target slip amount $N_s^*$. For example, in the lockup-on range, which is a relatively high vehicle speed range, the lockup clutch 42 is locked up (completely engaged) to directly couple the pump impeller 14a to the turbine impeller 14b, thereby eliminating a slip loss (internal loss) of the torque converter 14 to improve fuel efficiency. In the lockup slip control operation range, which is a relatively low/middle speed range, slip control (lockup slip control) is provided that achieves engagement with a predetermined slight slip given between the pump impeller 14a and the turbine impeller 14b to expand the range of operation of the lockup clutch 42, thereby enhancing the transmission efficiency of the torque converter 14 to improve fuel efficiency.

The vehicle acceleration determining means 140 determines whether the accelerator pedal 104 is deeply depressed at the time of start or acceleration of the vehicle 6, in other words, whether a driver performs an acceleration operation of the vehicle 6. Describing for confirmation, the acceleration operation includes an acceleration operation at the time of start. For example, the vehicle acceleration determining means 140 sequentially detects the accelerator opening degree Acc to determine whether an increase width WAcc of the accelerator opening degree Acc within a predetermined accelerator opening degree change determination time $TIME_{AC}$ is equal to or greater than a predetermined accelerator opening degree increase width determination value WAC1 and determines that the accelerator pedal 104 is deeply depressed if the increase width WAcc is equal to or greater than the accelerator opening degree increase width determination value WAC1. Alternatively, the vehicle acceleration determining means 140 may sequentially calculate an accelerator opening degree increase rate RAcc that is an increase width of the accelerator opening degree Acc per unit time to determine whether the accelerator opening degree increase rate RAcc is equal to or greater than a predetermined accelerator opening degree increase rate determination value RAC1 and may determine that the accelerator pedal 104 is deeply depressed if the accelerator opening degree increase rate RAcc is equal to or greater than the accelerator opening degree increase rate determination value RAC1. For example, the accelerator opening degree change determination time $TIME_{AC}$, the accelerator opening degree increase width determination value WAC1, and the accelerator opening degree increase rate determination value RAC1 are empirically determined in advance so as to determine whether the vehicle start or acceleration performed by the depressing operation of the accelerator pedal 104 should be implemented through fuel cut electric motor drive control described later in terms of improvement in fuel efficiency.

The lockup clutch operation state determining means 142 determines whether or not the lockup clutch 42 is in the released state or the slip state. For example, the lockup clutch operation state determining means 142 may determine the operation state of the lockup clutch 42 based on the lockup control command signal output by the lockup clutch control means 138 to the hydraulic control circuit 132 or may determine the operation state of the lockup clutch 42 based on a vehicle state indicated by the actual vehicle speed V and the accelerator opening degree Acc from the lockup range diagram.

The fuel cut availability determining means 144 determines whether a request drive torque (driver request torque) Toutd requested from a driver can be output if a fuel cut for the engine 10 is performed. Specifically, the fuel cut availability determining means 144 estimates a maximum drive torque that can be output when the fuel cut electric motor drive control means 146 provides the fuel cut electric motor drive control described later, based on a maximum output torque Tmgmax of the electric motor MG (hereinafter referred to as an electric motor maximum torque Tmgmax) determined in advance as characteristics of the electric motor MG. The fuel cut availability determining means 144 then determines whether an estimated maximum drive torque TSoutmax capable of being output during the fuel cut electric motor drive control (hereinafter referred to as a fuel-cut-time estimated maximum drive torque TSoutmax), or specifically, the fuel-cut-time estimated maximum drive torque TSoutmax calculated by using the following Equations (1) and (2) is greater than the request drive torque Toutd, and determines that the request drive torque Toutd can be output even when the fuel cut is performed if the fuel-cut-time estimated maximum drive torque TSoutmax is greater than the request drive torque Toutd. For example, the request drive torque Toutd is a torque in the output gear 72 and is calculated based on the accelerator opening degree Acc from relationship empirically determined in advance such that the request drive torque Toutd is made larger when the accelerator opening degree Acc is larger. The fuel-cut-time estimated maximum drive torque TSoutmax is calculated by using the following Equation (1) and an engine cranking torque Tecr in Equation (1) is a cranking torque necessary for rotating the engine 10 during fuel cut and is calculated by using the following Equation (2).

$$TSoutmax = (Tmgmax - Tecr) \times RT_{TC} \times \gamma \qquad (1)$$

$$Tecr = (I_{EG} \times NA_{EG}) + F_{EG} \qquad (2)$$

For Tmgmax in Equation (1), a torque around the first axial center RC1 is used that is converted from the electric motor maximum torque Tmgmax by taking into account a gear ratio of the gear pair made up of the electric motor output gear 56 and the electric motor coupling gear 58. In Equation (1), $RT_{TC}$ is a torque ratio (=output torque/input torque) of the torque converter 14 and γ is a gear ratio of the automatic transmission 18. $I_{EG}$ in Equation (2) is the inertia moment (engine inertia moment) around the crankshaft 32 of the engine 10; $NA_{EG}$ is a rotational angular acceleration (e.g., in rad/s$^2$) of the engine 10; $F_{EG}$ is an engine rotation resistance (e.g., in Nm), i.e., engine friction, when the engine 10 is cranked. The engine inertia moment $I_{EG}$ and the engine rotation resistance $F_{EG}$ are empirically obtained in advance and are set as constants, for example. The engine rotational angular acceleration $NA_{EG}$ and the torque ratio $RT_{TC}$ used in Equations (1) and (2) may be acquired by predicting a maximum value of the engine rotational angular acceleration $NA_{EG}$ during the fuel cut electric motor drive control and the torque ratio $RT_{TC}$ when the engine rotational angular acceleration $NA_{EG}$ is maximized, respectively, or may be acquired by predicting the engine rotational angular acceleration $NA_{EG}$ and the torque ratio $RT_{TC}$ after a predetermined time has elapsed from the start of the fuel cut electric motor drive control. In any case, the engine rotational angular acceleration $NA_{EG}$ and the torque ratio $RT_{TC}$ used in Equations (1) and (2) are obtained from, for example, relationship empirically determined in advance, based on the current engine rotation speed Ne, the turbine rotation speed Nt, the accelerator opening degree Acc, a change rate of the accelerator opening degree Acc, an operation state of the lockup clutch 42, etc. For the gear ratio γ of the automatic transmission 18 in Equation (1), a value at the time of calculation of Equation (1) is used, for example.

As described above, when calculating the fuel-cut-time estimated maximum drive torque TSoutmax by using Equations (1) and (2), the fuel cut availability determining means 144 may sequentially calculate the fuel-cut-time estimated maximum drive torque TSoutmax to sequentially determine whether the fuel-cut-time estimated maximum drive torque TSoutmax is greater than the request drive torque Toutd; however, in this embodiment, if the vehicle acceleration determining means 140 determines that the accelerator pedal 104 is deeply depressed and the lockup clutch operation state determining means 142 determines that the lockup clutch 42 is in the released state or the slip state, the fuel cut availability determining means 144 calculates the fuel-cut-time estimated maximum drive torque TSoutmax to determine whether the fuel-cut-time estimated maximum drive torque TSoutmax is greater than the request drive torque Toutd.

The fuel cut electric motor drive control means 146 increases the engine rotation speed Ne with the drive force of the electric motor MG and provides the fuel cut electric motor drive control interrupting the fuel supply to the engine 10 at the time of acceleration operation of the vehicle 6. Specifically, if the fuel cut availability determining means 144 determines that the fuel-cut-time estimated maximum drive torque TSoutmax is greater than the request drive torque Toutd with consideration also given to conditions other than the acceleration operation, i.e., if the accelerator pedal 104 is deeply depressed; the lockup clutch 42 is in the released state or the slip state; and the request drive torque Toutd can be output even when the fuel cut is performed, the fuel cut electric motor drive control means 146 provides the fuel cut electric motor drive control. As a result, the engine rotation speed Ne is increased while the vehicle 6 is accelerated. Since the engine rotation speed Ne is increased by the drive force of the electric motor MG while the fuel cut electric motor drive control is provided, the fuel cut electric motor drive control means 146 engages the engine intermittent clutch K0 to provide the fuel cut electric motor drive control. Although the engine 10 is not allowed to output power during the fuel cut electric motor drive control, the fuel cut electric motor drive control means 146 controls the electric motor torque Tmg such that the same torque is sequentially input to the pump impeller 14a of the torque converter 14 as in the case that the fuel supply interruption, i.e., fuel cut is not performed for the engine 10, so as not to give an uncomfortable feeling to a driver. Although the fuel cut electric motor drive control means 146 provides the fuel cut electric motor drive control in the course of increasing the engine rotation speed Ne, specifically, the fuel cut electric motor drive control means 146 sequentially detects an engine rotational angular speed (e.g., in rad/s) with the engine rotation speed sensor 120 to sequentially calculate the engine rotational angular acceleration $NA_{EG}$ based on the engine rotational angular speed and provides the fuel cut electric motor drive control from when the engine rotational angular acceleration $NA_{EG}$ exceeds a predetermined engine rotational angular acceleration determination value $NA1_{EG}$ until the temporarily increased engine rotational angular acceleration $NA_{EG}$ becomes equal to or less than the engine rotational angular acceleration determination value $NA1_{EG}$. In other words, in the course of increasing the engine rotation speed Ne at the time of the acceleration operation of the vehicle 6, if the engine rotational angular acceleration $NA_{EG}$ exceeds the engine rotational angular acceleration determination value $NA1_{EG}$, the fuel cut electric motor drive control means 146 starts the fuel cut electric motor drive control and, if the engine rotational angular acceleration $NA_{EG}$ becomes equal to or less than the engine rotational angular acceleration determination value $NA1_{EG}$ after starting the provision of the fuel cut electric motor drive control, the fuel cut electric motor drive control means 146 terminates the fuel cut electric motor drive control.

For example, at the time of vehicle start, as depicted in a time chart of the rotation speeds Ne, Nmg, and Nt of FIG. 6, the engine rotation speed Ne acting as the input rotation speed of the torque converter 14 is once increased greater than the turbine rotation speed Nt to promptly increase the turbine rotation speed Nt in response to the accelerator pedal depressing operation of a driver, i.e., the acceleration operation of the vehicle 6 and, when the turbine rotation speed Nt is increased to a certain degree, the engine rotation speed Ne is reduced to be identical to the turbine rotation speed Nt. In FIG. 6, the fuel cut electric motor drive control means 146 provides the fuel cut electric motor drive control from time $t_{A1}$ when the engine rotational angular acceleration $NA_{EG}$ exceeds the engine rotational angular acceleration determination value $NA1_{EG}$ until time $t_{A2}$ when the once increased engine rotational angular acceleration $NA_{EG}$ decreases over time and becomes equal to or less than the engine rotational angular acceleration determination value $NA1_{EG}$. The same applies to another example, i.e., the case of vehicle acceleration. Specifically, as depicted in a time chart of the rotation speeds Ne, Nmg, and Nt at the time of acceleration during vehicle running of FIG. 7, the fuel cut electric motor drive control means 146 provides the fuel cut electric motor drive control from time $t_{B1}$ when the engine rotational angular acceleration $NA_{EG}$ exceeds the engine rotational angular acceleration determination value $NA1_{EG}$ until time $t_{B2}$ when the once increased engine rotational angular acceleration $NA_{EG}$ decreases over time and becomes equal to or less than the engine rotational angular acceleration determination value $NA1_{EG}$. Although the fuel cut electric motor drive control means 146 performs the fuel cut for the engine 10 between time $t_{A1}$ and time $t_{A2}$ of FIG. 6 and between time $t_{B1}$ and time $t_{B2}$ of FIG. 7, in these fuel cut periods (time $t_{A1}$ to $t_{A2}$ of FIG. 6, time $t_{B1}$ to $t_{B2}$ of FIG. 7), the electric motor MG is caused to output the sequentially varying engine cranking torque Tecr in addition to the torque to be input to the pump impeller 14a of the torque converter 14 for driving the drive wheels 28 so that the engine rotation speed Ne is changed in the same way as when the fuel cut is not performed.

Other than during the provision of the fuel cut electric motor drive control, for example, the engine 10 drives the drive wheels 28 and an assist torque from the electric motor MG is output at the same time as needed based on a vehicle state indicated by the accelerator opening degree Acc and the vehicle speed V from relationship empirically determined in advance so as to satisfy both the fuel efficiency performance and the running performance. The engine rotational angular acceleration determination value $NA1_{EG}$ is empirically determined in advance so as to suppress an uncomfortable feeling to a driver and improve fuel efficiency and is set to zero or a positive value close to zero, for example. In FIGS. 6 and 7, the engine intermittent clutch K0 is always engaged. The electric motor rotation speed Nmg is kept higher than the engine rotation speed Ne in FIGS. 6 and 7 because the electric motor rotation speed Nmg is decelerated by the gear pair made up of the electric motor output gear 56 and the electric motor coupling gear 58 before transmitted to the pump impeller 14a.

Figure 8:
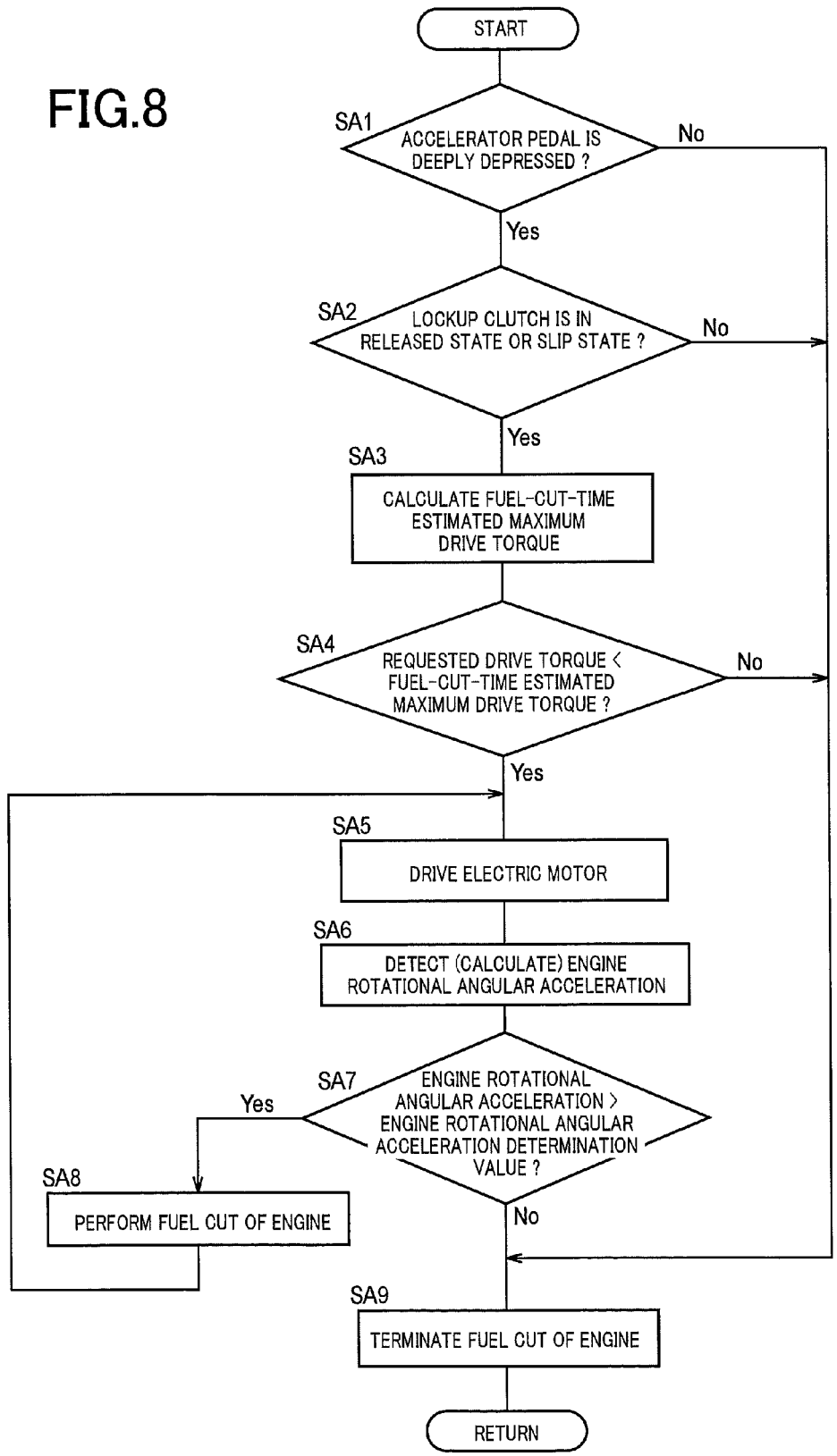
FIG. 8 is a flowchart for explaining a main portion of control operation of the electronic control device of FIG. 4, i.e., control operation of providing the fuel cut electric motor drive control.

FIG. 8 is a flowchart for explaining a main portion of control operation of the electronic control device 110, i.e., control operation of providing the fuel cut electric motor drive control and is repeatedly executed with an extremely short cycle time, for example, on the order of few msec to a few tens of msec. The control operation depicted in FIG. 8 is performed solely or concurrently with another control operation.

First, at step (hereinafter, "step" will be omitted) SA1 corresponding to the vehicle acceleration determining means 140, it is determined whether the accelerator pedal 104 is deeply depressed, or in other words, whether a driver performs the acceleration operation of the vehicle 6. For example, if the increase width WAcc of the accelerator opening degree Acc within the accelerator opening degree change determination time $TIME_{AC}$ is equal to or greater than the accelerator opening degree increase width determination value WAC1, it is determined that the accelerator pedal 104 is deeply depressed. If the determination at SA1 is affirmative, i.e., if the accelerator pedal 104 is deeply depressed, the operation goes to SA2. On the other hand, if the determination at SA1 is negative, the operation goes to SA9.

At SA2 corresponding to the lockup clutch operation state determining means 142, it is determined whether or not the lockup clutch 42 is in the released state or the slip state. If the determination at SA2 is affirmative, i.e., if the lockup clutch 42 is in the released state or the slip state, the operation goes to SA3. On the other hand, if the determination at SA2 is negative, the operation goes to SA9.

At SA3 corresponding to the fuel cut availability determining means 144, the fuel-cut-time estimated maximum drive torque TSoutmax is calculated from Equations (1) and (2). After SA3, the operation goes to SA4.

At SA4 corresponding to the fuel cut availability determining means 144, it is determined whether the fuel-cut-time estimated maximum drive torque TSoutmax calculated at SA3 is greater than the request drive torque Toutd. If the determination at SA4 is affirmative, i.e., if the fuel-cut-time estimated maximum drive torque TSoutmax is greater than the request drive torque Toutd, the operation goes to SA5. On the other hand, if the determination at SA4 is negative, the operation goes to SA9.

At SA5, the electric motor MG is energized and a drive force is generated by the electric motor MG. At this time, the engine intermittent clutch K0 is in the engaged state and the electric motor MG is controlled such that the torque input to the pump impeller 14a of the torque converter 14 and the rotation speed of the pump impeller 14a are sequentially made equal to those when a fuel cut is not performed. For example, to control the electric motor MG in this way during a fuel cut, the engine 10 must be cranked by the electric motor torque Tmg and, therefore, the electric motor MG is caused to output the sequentially varying engine cranking torque Tecr in addition to the torque to be input to the pump impeller 14a. After SA5, the operation goes to SA6.

At SA6, the engine rotational angular speed is detected by the engine rotation speed sensor 120 and the engine rotational angular acceleration $NA_{EG}$ is calculated based on the engine rotational angular speed. The engine rotational angular acceleration $NA_{EG}$ may directly be detected by an acceleration sensor etc. After SA6, the operation goes to SA7.

At SA7, it is determined whether the engine rotational angular acceleration $NA_{EG}$ calculated at SA6 is greater than the engine rotational angular acceleration determination value $NA1_{EG}$. If the determination at SA7 is affirmative, i.e., if the engine rotational angular acceleration $NA_{EG}$ is greater than the engine rotational angular acceleration determination value $NA1_{EG}$, the operation goes to SA8. On the other hand, if the determination at SA7 is negative, the operation goes to SA9.

At SA8, a fuel cut for the engine 10 is performed. If the fuel cut is already performed, the fuel cut is continued. After SA8, the operation returns to SA5 and is repeated from SA5 to SA8 to provide the fuel cut electric motor drive control.

At SA9, the fuel cut started at SA8 is terminated. Therefore, the fuel cut electric motor drive control is terminated. If the fuel cut is already terminated, the non-performance of the fuel cut is continued. SA5 to SA9 correspond to the fuel cut electric motor drive control means 146.

According to this embodiment, the fuel cut electric motor drive control means 146 increases the engine rotation speed Ne with the drive force of the electric motor MG and provides the fuel cut electric motor drive control interrupting the fuel supply to the engine 10 at the time of the acceleration operation of the vehicle 6. When the engine rotation speed Ne is increased at the time of vehicle acceleration, fuel efficiency deterioration can often be suppressed by increasing the engine rotation speed Ne by electric motor drive rather than engine drive. This is because the electric storage device 46 is charged if the electric motor MG performs regenerative operation, for example, during deceleration while a vehicle is running. Therefore, if the engine rotation speed is increased, the interruption of the fuel supply to the engine by the fuel cut electric motor drive control can suppress the fuel efficiency deterioration. Particularly, if an increase in the engine rotation speed Ne at the time of vehicle start or acceleration is rapid or temporary, the fuel efficiency deterioration can more significantly be suppressed. For this reason, in this embodiment, the fuel cut electric motor drive control is provided when the accelerator pedal 104 is deeply depressed and the lockup clutch 42 is in the released state or the slip state, i.e., when the engine rotation speed Ne tends to rapidly increase as depicted in FIGS. 6 and 7 and, therefore, the fuel efficiency deterioration can effectively be suppressed.

According to this embodiment, the fuel cut availability determining means 144 determines whether the maximum drive torque TSoutmax capable of being output during the fuel cut electric motor drive control estimated based on the maximum output torque Tmgmax of the electric motor MG (the fuel-cut-time estimated maximum drive torque TSoutmax) is greater than the request drive torque Toutd, and the fuel cut electric motor drive control means 146 provides the fuel cut electric motor drive control on condition that the fuel-cut-time estimated maximum drive torque TSoutmax is greater than the request drive torque Toutd. Therefore, the fuel cut for the engine can be prevented from making the drive force of the vehicle 6 insufficient in the fuel cut electric motor drive control so as not to give an uncomfortable feeling to a driver.

According to this embodiment, the fuel cut electric motor drive control means 146 terminates the fuel cut electric motor drive control if the engine rotational angular acceleration $NA_{EG}$ becomes equal to or less than the engine rotational angular acceleration determination value $NA1_{EG}$ after starting the provision of the fuel cut electric motor drive control. Therefore, since the engine rotational angular acceleration $NA_{EG}$ can easily be calculated by sequentially detecting the engine rotation speed Ne, the ending time of the fuel cut electric motor drive control can easily be determined.

According to this embodiment, the drive device 8 further comprises the automatic transmission 18 interposed between the drive wheels 28 and both the engine 10 and the electric motor MG, and the torque converter 14 interposed between the automatic transmission 18 and both the engine 10 and the electric motor MG. Therefore, when a change in the engine rotation speed Ne is more temporary or rapid, the inertia torque of the engine 10 is made larger and a greater fuel efficiency improvement effect is acquired by increasing the engine rotation speed Ne with the electric motor MG and since the engine rotation speed Ne tends to temporarily increase due to a slip of the torque converter 14, for example, at the time of vehicle acceleration, the provision of the fuel cut electric motor drive control can more properly produce the effect of suppressing the fuel efficiency deterioration in the drive device 8 having the torque converter 14.

According to this embodiment, the torque converter 14 includes the lockup clutch 42 capable of directly coupling the pump impeller 14a and the turbine impeller 14b and the fuel cut electric motor drive control means 146 provides the fuel cut electric motor drive control when the lockup clutch 42 is in the released state or the slip state, and does not provide the fuel cut electric motor drive control when the lockup clutch 42 is in the engaged state. Therefore, for example, since the engine rotation speed Ne tends to temporarily increase when the lockup clutch 42 is in the released state or the slip state at the time of vehicle acceleration etc., as compared to the engaged state, the provision of the fuel cut electric motor drive control can more properly produce the effect of suppressing the fuel efficiency deterioration.

Although the embodiment of the present invention has been described in detail with reference to the drawings, this is merely an exemplary embodiment and the present invention may be implemented in variously modified and improved forms based on the knowledge of those skilled in the art.

Figure 9:
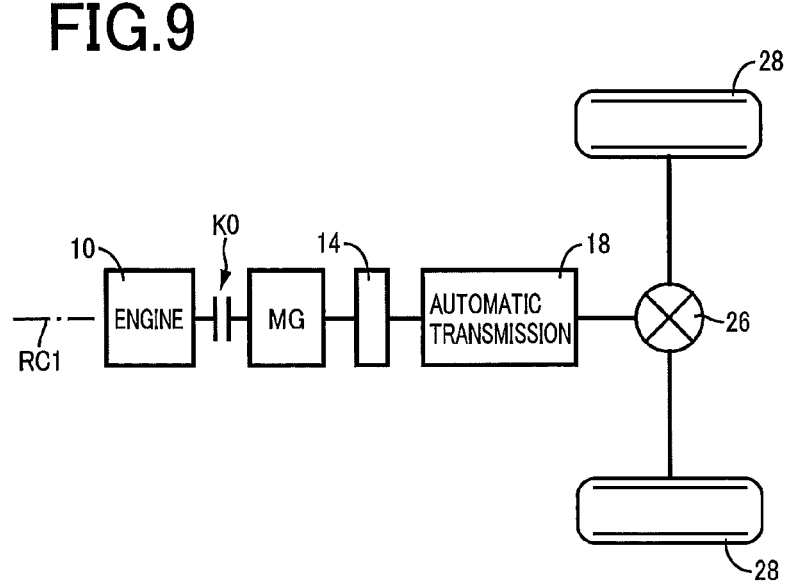
FIG. 9 is an exemplarily illustrated schematic of a vehicle control device to which the present invention different from the vehicle drive device of FIG. 1 is preferably applied, and in which the engine, the electric motor, a torque converter, and the automatic transmission are coupled in series on the one axial center.

For example, although the electric motor MG is disposed on the second axial center RC2 different from the rotational axial center of the engine 10 (the first axial center RC1) in the embodiment, the electric motor MG may be disposed in series with the engine 10 on the first axial center RC1 as depicted in FIG. 9. If the electric motor MG and the engine 10 are disposed in series as depicted in FIG. 9, the electric motor rotation speed Nmg is made identical to the engine rotation speed Ne when the engine intermittent clutch K0 is engaged and, therefore, in the time charts of FIGS. 6 and 7, the electric motor rotation speed Nmg is identical to the time chart of the engine rotation speed Ne.

Figure 10:
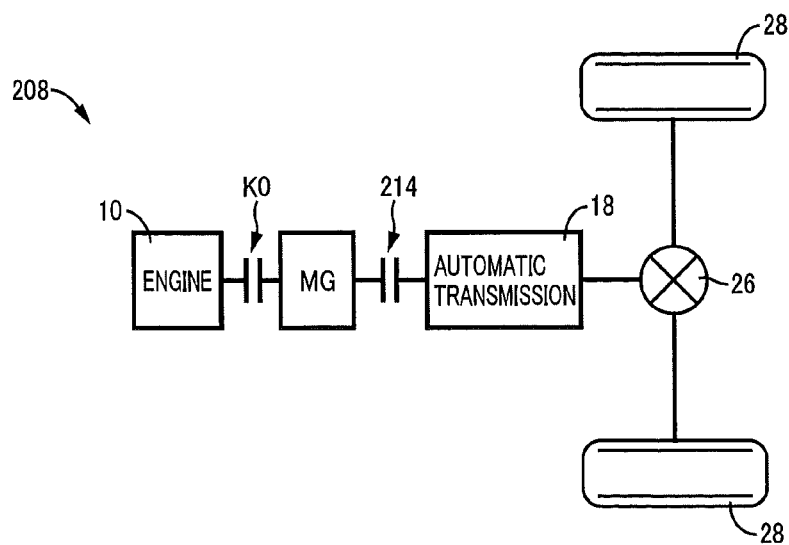
FIG. 10 is an exemplarily illustrated schematic of a vehicle control device to which the present invention different from the vehicle drive device of FIG. 1 is preferably applied, and in which the engine, the electric motor, the friction engagement device, and the automatic transmission are coupled in series on the one axial center.

Although the drive device 8 includes the torque converter 14 in the embodiment, a friction engagement device 214 such as a hydraulic clutch capable of varying a transmission torque capacity with an engagement force may be interposed instead of the torque converter 14 between both the engine 10 and the electric motor MG and the automatic transmission 18 as depicted in FIG. 10. A vehicle drive device 208 depicted in FIG. 10 further comprises the automatic transmission 18 interposed between the drive wheels 28 and both the engine 10 and the electric motor MG, and the friction engagement device 214 interposed between the automatic transmission 18 and both the engine 10 and the electric motor MG and causes the friction engagement device 214 to slip to generate a creep torque. For example, the fuel cut electric motor drive control can be provided in a hybrid vehicle having the engine 10, the electric motor MG, the friction engagement device 214, and the automatic transmission 18 coupled in series and the provision of the fuel cut electric motor drive control can suppress the fuel efficiency deterioration in the vehicle drive device 208. In the case of the vehicle drive device 208, the flowchart of FIG. 8 does not include SA2 and if the determination at SA1 is affirmative, the operation goes to SA3. While the fuel cut electric motor drive control is provided, the engine intermittent clutch K0 and the friction engagement device 214 are engaged.

Although the engine intermittent clutch K0 is disposed in FIG. 1 of the embodiment, the engine 10 may directly be coupled to the pump impeller 14a of the torque converter 14 without the engine intermittent clutch K0. In the drive device 8 without the engine intermittent clutch K0, the electric motor MG is operatively coupled to the engine 10 or directly coupled to the engine 10.

In the embodiment, the fuel cut electric motor drive control is not provided if the lockup clutch 42 is in the engaged state, which is preferable; however, even the fuel cut electric motor drive control may be provided if the lockup clutch 42 is in the engaged state.

Although the flowchart of FIG. 8 has SA3 and SA4 in the embodiment, the flowchart may not have SA3 and SA4 and if the determination at SA2 is affirmative, the operation may go to SA5.

Although the request drive torque Toutd compared with the fuel-cut-time estimated maximum drive torque TSoutmax is described as a torque in the output gear 72 in the embodiment, the request drive torque Toutd may be any torque at the same location as the fuel-cut-time estimated maximum drive torque TSoutmax and may be a torque in the drive wheels 28, for example. However, if the request drive torque Toutd is a torque in the drive wheels 28, the fuel-cut-time estimated maximum drive torque TSoutmax must be calculated by taking into account the gear ratio of the final gear pair 24, the gear ratio of the differential gear device 26, etc.

Although the drive device 8 is transversely mounted on the FF type vehicle 6 in the embodiment, the vehicle 6 may be of the FR type and the drive device 8 may be longitudinally mounted.

Although the electric motor MG is coupled through one gear pair made up of the electric motor output gear 56 and the electric motor coupling gear 58 to the pump impeller 14a of the torque converter 14 in the embodiment, such a gear pair is not limitation and the electric motor MG may be coupled through a transmission belt or a chain to the pump impeller 14a.

Although the electric motor MG is coupled to the pump impeller 14a of the torque converter 14 in the embodiment, the electric motor MG may be coupled to the turbine impeller 14b instead of the pump impeller 14a.

Although the lockup clutch 42 is disposed in the embodiment, the lockup clutch 42 is not essential.

Although the torque converter 14 is used as a fluid transmission device in the drive device 8 of the embodiment, for example, the torque converter 14 may be replaced with a fluid coupling such as a fluid coupling without a torque amplification effect. Alternatively, the drive device 8 may not be disposed with the torque converter 14 and the engine 10 and the electric motor MG may be coupled to the transmission input shaft 70. In the case of the drive device 8 without the torque converter 14, for example, it is not necessary to take into account the torque ratio $RT_{TC}$ in Equation (1) and since the flowchart of FIG. 8 does not include SA2, if the determination at SA1 is affirmative, the operation goes to SA3.

Although the automatic transmission 18 is a stepped automatic transmission in the embodiment, the automatic transmission 18 may be a CVT capable of continuously varying the gear ratio γ or may be replaced with a manual transmission. The drive device 8 without the automatic transmission 18 is also conceivable. In the configuration of the drive device 8 without the automatic transmission 18, it is not necessary to take into account the gear ratio γ in Equation (1), for example.

Although the hydraulic pump 16 is a mechanical oil pump rotationally driven by the electric motor MG in the embodiment, the hydraulic pump 16 may be an electric oil pump. If the hydraulic pump 16 is an electric oil pump, the hydraulic pump 16 may be disposed separately from the first axial center RC1 and may not be rotated and driven by the electric motor MG.

NOMENCLATURE OF ELEMENTS

6: vehicle
8, 208: drive device (vehicle drive device)
10: engine
14: torque converter (fluid transmission device)
14a: pump impeller (input-side rotating element)
14b: turbine impeller (output-side rotating element)
18: automatic transmission (transmission)
28: drive wheels
42: lockup clutch
110: electronic control device (control device)
214: friction engagement device
MG: electric motor

The invention claimed is:

1. A control device of a vehicle drive device having an electric motor coupled to a power transmission path between an engine and drive wheels,
the control device providing fuel cut electric motor drive control of increasing a rotation speed of the engine with a drive force of the electric motor and interrupting fuel supply to the engine at the time of acceleration operation of a vehicle, and
the fuel cut electric motor drive control being terminated if a rotational angular acceleration of the engine becomes equal to or less than a predetermined engine rotational angular acceleration determination value after starting provision of the fuel cut electric motor drive control.

2. The control device of a vehicle drive device of claim 1, wherein
the fuel cut electric motor drive control is provided on the condition that a maximum drive torque capable of being output during the fuel cut electric motor drive control estimated based on a maximum output torque of the electric motor is greater than a request drive torque requested by a driver.

3. The control device of a vehicle drive device of claim 2, wherein
the vehicle drive device further comprises a transmission interposed between the drive wheels and both the engine and the electric motor and a fluid transmission device interposed between the transmission and both the engine and the electric motor.

4. The control device of a vehicle drive device of claim 3, wherein
the fluid transmission device includes a lockup clutch capable of directly coupling an input-side rotating element and an output-side rotating element of the fluid transmission device, and wherein
the fuel cut electric motor drive control is provided when the lockup clutch is in a released state or a slip state.

5. The control device of a vehicle drive device of claim 2, wherein
the vehicle drive device further comprises a transmission interposed between the drive wheels and both the engine and the electric motor and a friction engagement device interposed between the transmission and both the engine and the electric motor.

6. The control device of a vehicle drive device of claim 1, wherein
the vehicle drive device further comprises a transmission interposed between the drive wheels and both the engine and the electric motor and a friction engagement device interposed between the transmission and both the engine and the electric motor.

7. The control device of a vehicle drive device of claim 1, wherein
the vehicle drive device further comprises a transmission interposed between the drive wheels and both the engine and the electric motor and a fluid transmission device interposed between the transmission and both the engine and the electric motor.

8. The control device of a vehicle drive device of claim 7, wherein
the fluid transmission device includes a lockup clutch capable of directly coupling an input-side rotating element and an output-side rotating element of the fluid transmission device, and wherein
the fuel cut electric motor drive control is provided when the lockup clutch is in a released state or a slip state.

* * * * *